United States Patent
Kathawate et al.

(10) Patent No.: US 8,960,973 B1
(45) Date of Patent: Feb. 24, 2015

(54) SPLICE ENCLOSURE FOR LUMINAIRES

(71) Applicants: Jyoti Kathawate, Smyrna, GA (US); James Richard Christ, Peachtree City, GA (US)

(72) Inventors: Jyoti Kathawate, Smyrna, GA (US); James Richard Christ, Peachtree City, GA (US)

(73) Assignee: Cooper Technologies Company, Houston, TX (US)

(\*) Notice: Subject to any disclaimer, the term of this patent is extended or adjusted under 35 U.S.C. 154(b) by 28 days.

(21) Appl. No.: 13/647,814

(22) Filed: Oct. 9, 2012

Related U.S. Application Data

(60) Provisional application No. 61/544,149, filed on Oct. 6, 2011.

(51) Int. Cl.
*H02G 15/18* (2006.01)
*F21V 15/01* (2006.01)

(52) U.S. Cl.
CPC .................................... *F21V 15/01* (2013.01)
USPC ............................. 362/375; 362/364; 174/92

(58) Field of Classification Search
CPC ............. H02G 2/14; H02G 3/08; F21V 21/04
USPC ................. 362/364–365, 375; 361/729–731; 174/92–93, 559–563, 250–268; 220/560.01
See application file for complete search history.

(56) References Cited

U.S. PATENT DOCUMENTS

| | | | | |
|---|---|---|---|---|
| 6,365,831 B1* | 4/2002 | Rupp et al. | | 174/50 |
| 7,141,738 B2* | 11/2006 | Marsac et al. | | 174/92 |
| 7,993,037 B1* | 8/2011 | Buse | | 362/365 |
| 2002/0092666 A1* | 7/2002 | Hasegawa et al. | | 174/92 |
| 2006/0079612 A1* | 4/2006 | Troutman et al. | | 524/99 |
| 2008/0105452 A1* | 5/2008 | King et al. | | 174/92 |

OTHER PUBLICATIONS

U.S. Plastics Corp. Article "What do the UL ratings mean?" Nov. 16, 2010 http://www.usplastic.com/knowledgebase/article.aspx?contentkey=881.*

\* cited by examiner

*Primary Examiner* — Evan Dzierzynski
*Assistant Examiner* — Naomi M Wolford
(74) *Attorney, Agent, or Firm* — King & Spalding LLP

(57) ABSTRACT

Splice enclosures for housing wire splice connections in a luminaire are described herein. The splice enclosures may each include a cover that includes one or more tabs extending substantially orthogonal from the cover, and a bottom housing (or body) having a base and two side walls and two end walls. Moreover, at least one of the side walls includes an outer surface having one or more protrusions for engaging the tab(s) of the cover. Additionally, at least one of the end walls includes a wire routing aperture. In some embodiments of the invention the cover may include at least one notched protrusion that aligns with the wire routing aperture to retain wires exiting an end wall of the splice enclosure.

16 Claims, 5 Drawing Sheets

SPLICE ENCLOSURE FOR LUMINAIRES

CROSS REFERENCE TO RELATED APPLICATION

This patent application claims priority under 35 U.S.C. Section 119 to U.S. Provisional Patent Application No. 61/544,149, titled "Splice Enclosure For Luminaires," filed Oct. 6, 2011. The complete disclosure of the above-identified priority application is hereby fully incorporated herein by reference.

TECHNICAL FIELD

Embodiments of the invention relate generally to lighting solutions, and more particularly to systems, methods, and devices for providing a splice enclosure for luminaires.

BACKGROUND

Current methods of enclosing splices include sheet metal "junction box" style housings, which limit the compatibility of luminaires to housings that are also fire resistant housing for wire splices. What is needed is a way of enclosing wire splices for luminaires, for example, recessed or surface mounted LED-based light fixtures, that is low cost and is compatible with a wide variety of recessed fixture housing types.

SUMMARY

According to an embodiment of the invention, there is disclosed a splice enclosure for a luminaire that includes a cover, where the cover includes at least one tab extending substantially orthogonal from the cover. The splice enclosure also includes a bottom housing having a base and two side walls and two end walls, where at least one of the side walls or end walls includes an outer surface having at least one protrusion, and at least two end walls or side walls each include a wire routing aperture. The cover may be hinged to at least one side wall or end wall of the bottom housing.

In accordance with one aspect of the invention, the cover and bottom housing are rectangular. According to another aspect of the invention, the splice enclosure further includes an interior surface of one of the end walls or side walls includes a rib protruding from the interior surface. In accordance with yet another aspect of the invention, the cover includes at least one notched protrusion that aligns with at least one wire routing aperture to retain wires exiting at least one end wall or side wall of the splice enclosure. According to another aspect of the invention the cover and bottom housing are made of a fire resistant material that satisfies a 5VA flame rating. In accordance with yet another aspect of the invention, the cover and bottom housing are coated with a fire resistant material that satisfies a 5VA flame rating.

In accordance with another embodiment of the invention, there is disclosed another splice enclosure for a luminaire. The splice enclosure includes a cover, where the cover includes at least two tabs extending substantially orthogonal from the cover, and where the tabs are located on opposite sides of the cover. The splice enclosure further includes a bottom housing having a base and two side walls and two end walls, where at least two of the side walls or end walls each include an outer surface having at least one protrusion, and where each of the at least two tabs engages the corresponding protrusion located on the exterior surface of one of the side walls or end walls of the bottom housing. The splice enclosure may include at least one wire routing aperture located in at least one end wall or side wall of the bottom housing.

According to one aspect of the invention, the cover and bottom housing are rectangular. In accordance with another aspect of the invention, the splice enclosure further includes an interior surface of one of the end walls or side walls includes a rib protruding from the interior surface. According to yet another aspect of the invention, the cover includes at least one notched protrusion that aligns with at least one wire routing aperture to retain wires exiting at least one end wall or side wall of the splice enclosure. In accordance with another aspect of the invention, the cover and bottom housing are made of a fire resistant material that satisfies a 5VA flame rating. According to yet another aspect of the invention, the cover and bottom housing are coated with a fire resistant material that satisfies a 5VA flame rating.

According to yet another embodiment of the invention, there is disclosed a luminaire that includes a light module, where the light module includes a light source, a driver with a first electrical connector connected to the driver and a second electrical connector connected to the first electrical connector. The luminaire further includes a splice enclosure surrounding the first and second electrical connector, where the splice enclosure includes a cover that includes at least one tab extending substantially orthogonal from the cover, and a bottom housing having a base and two side walls and two end walls, where at least one of the side walls or end walls includes an outer surface having at least one protrusion. The luminaire also may have the tab engage with the protrusion, where at least one end wall or side wall of the bottom housing include at least one wire routing aperture.

In accordance with one aspect of the invention, the second electrical connector is attached to a third electrical connector located outside the splice enclosure, where the third electrical connector is connected to a receptacle. According to another aspect of the invention, the receptacle is associated with a recessed light fixture or a junction box. In accordance with yet another aspect of the invention, the cover is hinged to at least one side wall or end wall of the bottom housing. According to another aspect of the invention, the cover includes at least two tabs extending substantially orthogonal from the cover, where the at least two tabs are located on opposite sides of the cover, and at least two of the side walls or end walls each include an outer surface having at least one protrusion, where each of the at least two tabs engages the corresponding protrusion located on the exterior surface of one of the side walls or end walls of the bottom housing. In accordance with yet another aspect of the invention, the cover includes at least one notched protrusion that aligns with at least one wire routing aperture to retain wires exiting at least one end wall or side wall of the splice enclosure. According to another aspect of the invention, the cover and bottom housing are made of a fire resistant material that satisfies a 5VA flame rating. In accordance with yet another aspect of the invention, the cover and bottom housing are coated with a fire resistant material that satisfies a 5VA flame rating.

BRIEF DESCRIPTION OF THE FIGURES

Figure 1:
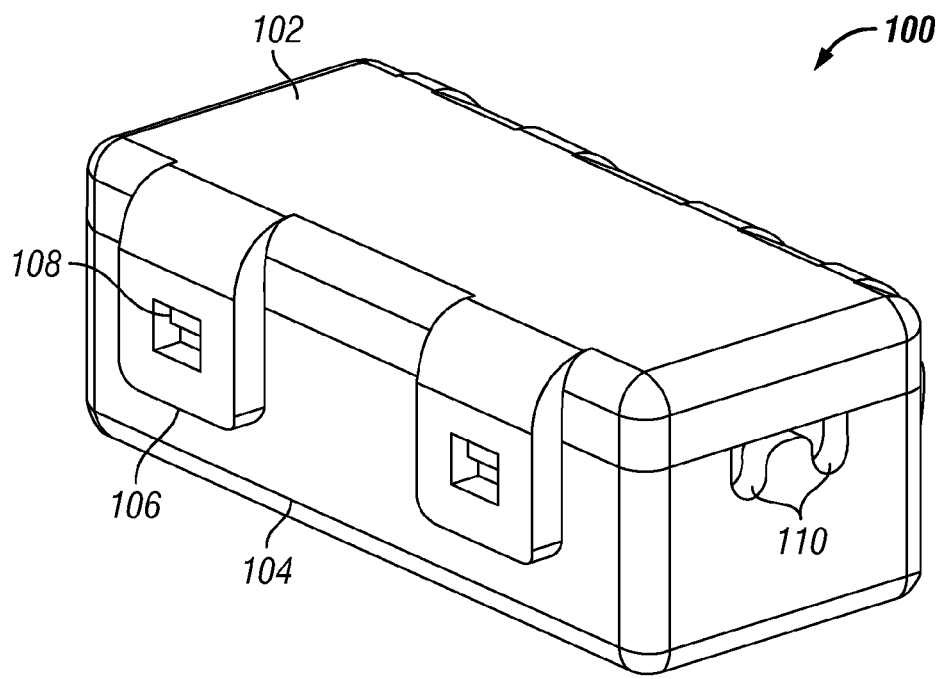

Having thus described the invention in general terms, reference will now be made to the accompanying drawings, which are not necessarily drawn to scale, and wherein:

FIG. 1 is a perspective view of the front of a hinged splice enclosure in accordance with an example embodiment of the invention.

Figure 2:
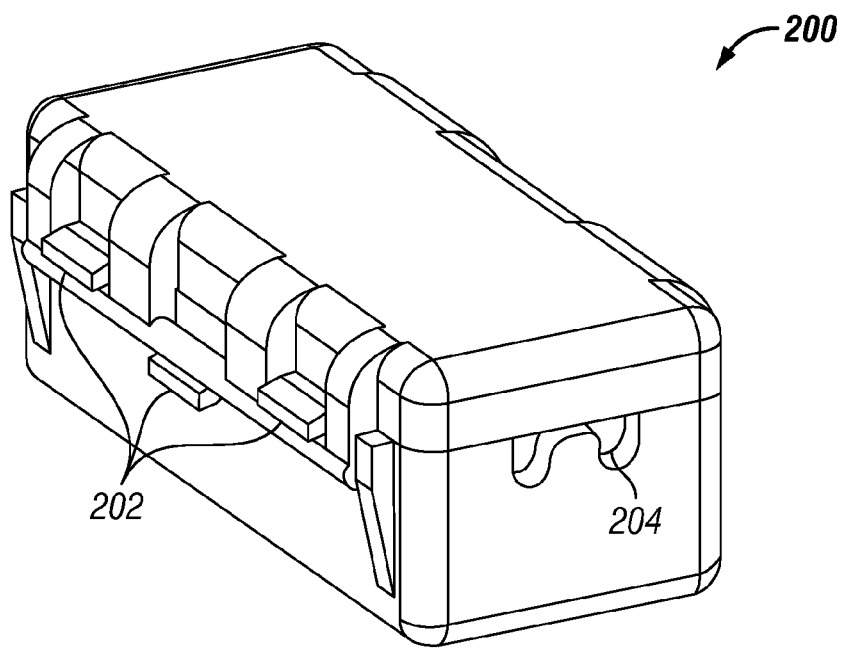

FIG. 2 is a perspective view of the back of a hinged splice enclosure in accordance with an example embodiment of the invention.

Figure 3:
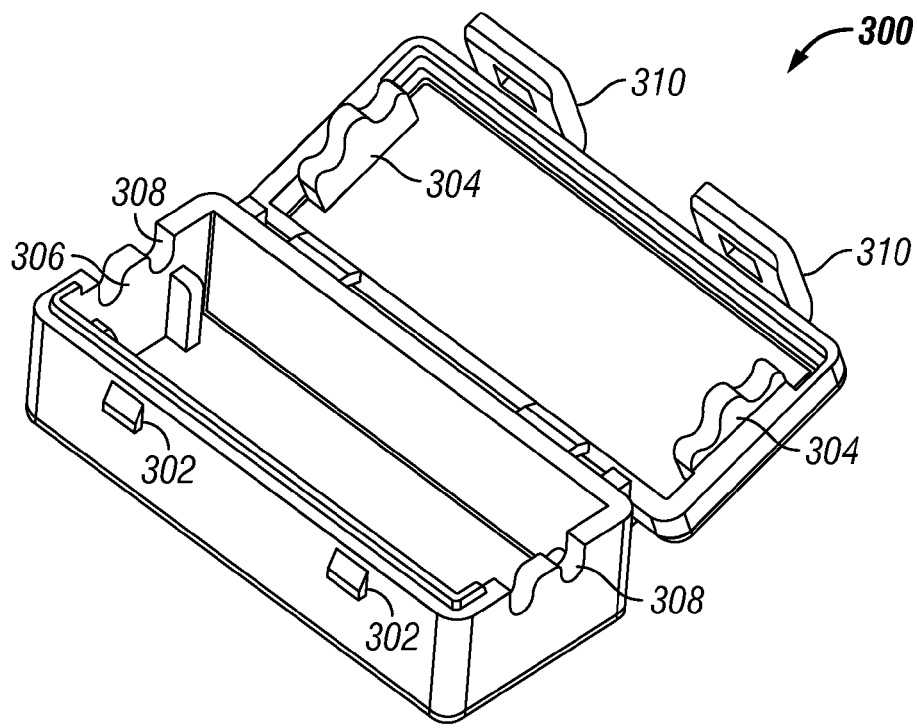

FIG. 3 is a perspective view of the inside portion of the hinged splice enclosure in accordance with an example embodiment of the invention.

Figure 4:
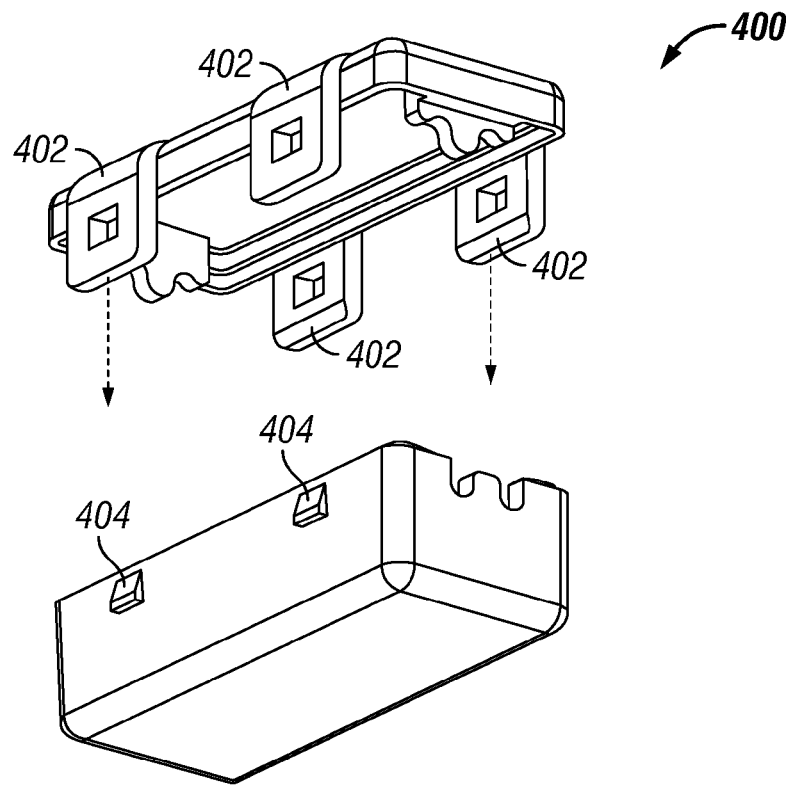

FIG. 4 is a perspective view of a snap fit splice enclosure in accordance with another example embodiment of the invention.

Figure 5:
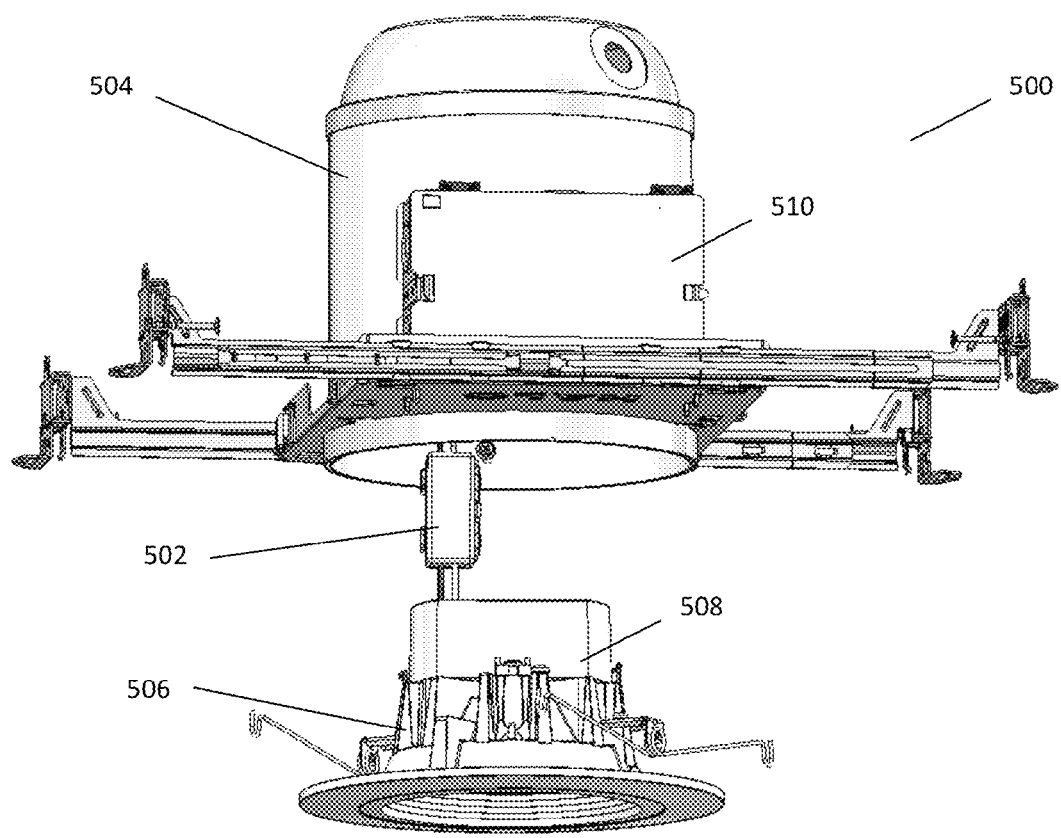

FIG. 5 is a recessed luminaire installation using a splice enclosure in accordance with an example embodiment of the invention.

Figure 6:
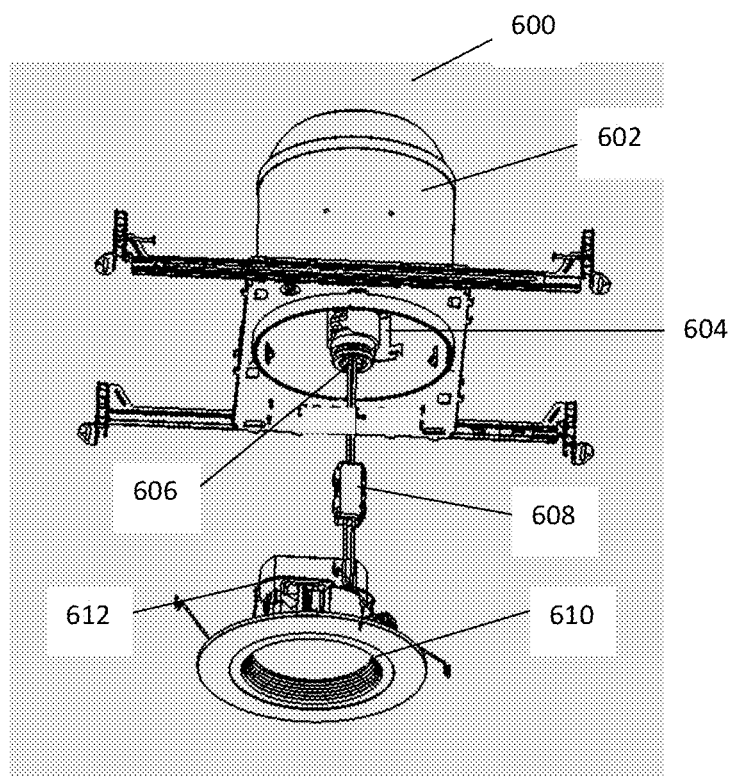

FIG. 6 shows another recessed luminaire installation using a splice enclosure in accordance with an example embodiment of the invention.

Figure 7:
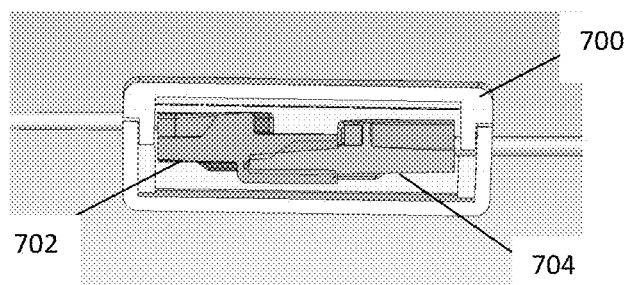

FIG. 7 is a cross sectional view of a splice enclosure showing the enclosed connection in accordance with an example embodiment of the invention.

Figure 8:
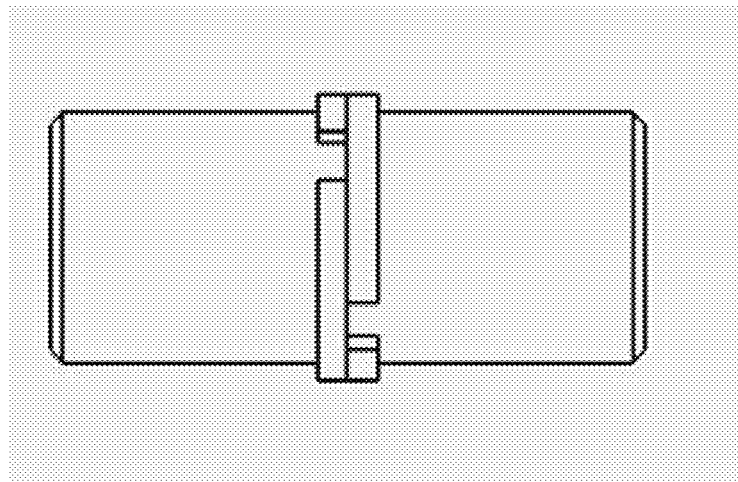

FIG. 8 is a front view of an alternate splice enclosure in a closed position in accordance with an example embodiment of the invention.

Figure 9:
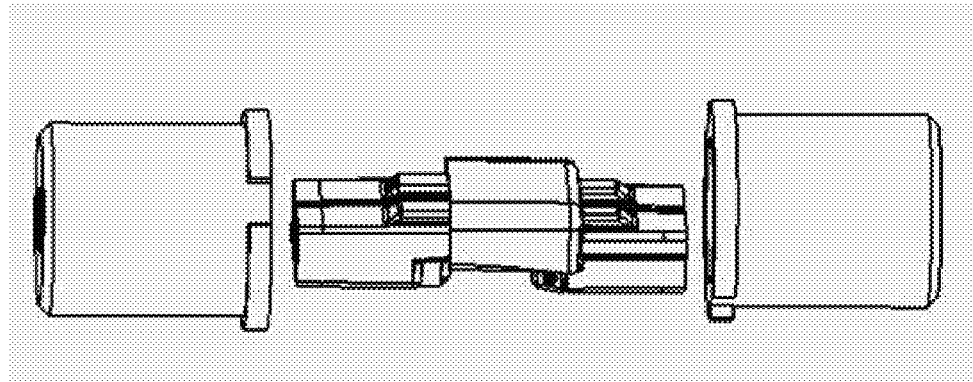

FIG. 9 is a front view of an alternate splice enclosure in an opened position in accordance with an example embodiment of the invention.

DETAILED DESCRIPTION OF EMBODIMENTS

Embodiments are directed to flame resistant enclosures for enclosing wire splices (or "splice box") used for luminaire wiring. The systems and methods described herein may provide several advantages including increasing the range of luminaire housing types which would be compatible with certain luminaires (e.g., recessed or surface mounted LED luminaires), allowing consumers more options for upgrading or retrofitting their existing lighting systems.

The systems, methods, and apparatuses described herein may also provide a lower cost solution than the junction box type enclosures currently used to house such wire splices. Moreover, the splice enclosures described herein may also allow for a reduction in the material, weight, and volume of the luminaire. In some embodiments of the invention, the relatively small size of the splice enclosure also allows luminaire designs for smaller or specialty housings. The manufacturing of the luminaire may also be improved by reducing the amount of fasteners used to build the luminaire, eliminates manufacturing time, and eliminates the need for tools to assemble and disassemble. The splice enclosures described herein may also improve safety for manufacturing as well as the installer, customer, and/or end user, as there are no sheet metal edges. Further, the splice enclosures described herein may include features that ensure that the splice connection is fully mated (also referred to as "terminal assurance" features).

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 is a perspective view of the front of a hinged splice enclosure 100 in accordance with an example embodiment of the invention. As shown in the example embodiment of FIG. 1, the splice enclosure 100 is a two-piece substantially rectangular hollow box with a top or cover 102 and a body 104 (or housing or bottom housing) having four sidewalls and a bottom wall. In alternative embodiments of the invention, the splice enclosure 100 may take a shape that is adequate to enclose the splice connection it is intended to cover (e.g., spherical, capsule, cylindrical, cubic, triangular, or another polygon shape). An example of alternate splice enclosure having a capsule shape is shown in a closed position in FIG. 8 and in an opened position in FIG. 9. The embodiment shown in FIG. 8 comprises two halves of a capsule that are attached to each other and enclose a connector. FIG. 9 shows the two halves of the capsule opened or separated and the connector that is enclosed therein.

Referring again to FIG. 1, the end walls include features such as two apertures 110 to retain wires as they pass through the splice enclosure 100. In an alternative embodiment of the invention, the apertures 110 may be located in the side walls of the body 104 or located in the cover 102. During either the manufacture of the luminaire or the installation of the luminaire, a wire splice connection between the luminaire and the power supply (or power supply connector) is placed into the splice enclosure 100 and the wires extend out the two end walls through the wire routing apertures 110. In the example embodiment shown in FIG. 1, the splice enclosure 100 uses hinges (shown in FIG. 2) and tabs 106 located on the cover 102 extending downwardly (or substantially orthogonal to the cover 102) that snap lock onto protrusions 108 located on the body 104 to secure the cover 102 and body 104 together. In alternative embodiments of the invention, the protrusions 108 may be located on the cover 102 and the tabs 106 may be located on the body 104 and provide essentially the same connection to close the splice enclosure 100.

The splice enclosure 100 of FIG. 1 and other splice enclosure embodiments of the invention may be made of plastic or a fire resistant or fire proof material. In some embodiments of the invention the splice enclosure 100 may be shaped without having any sharp edges, such as the rounded edges shown in the alternate capsule shape in FIG. 8 and FIG. 9. In certain embodiments of the invention the splice box may be constructed from of material that satisfies flame resistance standards such as 5VA, or the material may be treated or coated in such a way that it becomes fire resistant/5VA compliant. For example, Kingfa VSLOY-PM may be used to construct the splice box, which is a PVC+ABS blend that meets the 5VA flame rating.

FIG. 2 is a perspective view of the back of a hinged splice enclosure 200 in accordance with an example embodiment of the invention. As shown in the example embodiment of FIG. 2, the splice enclosure 200 includes hinges 202 on the back of the splice enclosure 200 to allow for easy connection of the cover and bottom housing without risk of losing either component. Also shown in FIG. 2 are the wire routing apertures 204 in the end wall of the splice enclosure 200.

FIG. 3 is a perspective view of the inside portion of the hinged splice enclosure 300 in accordance with an example embodiment of the invention. As shown in the example embodiment of FIG. 3, there are internal features for rigidity as well as connection assurance and wire retention. As shown in the example embodiment of FIG. 3 these internal features include structural ribs 306 located on the internal side of the end walls of the body of the splice enclosure 300 to provide structure and increased rigidity of the splice enclosure 300. Additionally, the notched protrusions 304 located on the internal ends of the cover of the splice enclosure 300, and the contoured grooves (or notches) 308 located in the end walls of the body work in conjunction to provide wire retention and assist with ensuring proper connection of the splice electrical connection contained in the splice enclosure 300 is maintained. In this example embodiment when the notched protrusions 304 and the contoured grooves 308 are aligned as the cover and body of the splice enclosure 300 are engaged, the overlapping of the notched protrusions 304 and contoured grooves 308 provide wire guidance and provide connection assurance by limiting the movement and external forces that could be placed on the wiring and/or splice connection and disconnect or displace the spliced connection.

The wire routing apertures and retention features shown in the example embodiment of FIG. 3 are for securing a particular type and/or style of connector and wire form factor and/or diameter combination, but in alternative embodiments of the invention, the wire routing apertures and retention features (such as the notched protrusions 304, the ribs 306, the contoured grooves 308, etc) may be reshaped or configured for different electrical connector shapes and/or different wire form factors. In other embodiments of the invention, the splice enclosure 300 may be configured or shaped to accommodate any number of different connector types and wire form factors (or diameters). Also shown in FIG. 3, are the protrusions 302 on the outside surface of a side wall of the splice enclosure body used to engage apertures in the tabs 310 of the hinged splice box cover.

FIG. 4 is a perspective view of a snap fit splice enclosure 400 in accordance with another example embodiment of the invention. The example embodiment of FIG. 4 is similar to the embodiments shown in FIGS. 1-3 except the cover and the body of the splice enclosure 400 are not hinged, rather the embodiment shown in FIG. 4 uses all snap-lock tabs to secure the cover and the body of the splice enclosure 400 eliminating the need for a hinged connection together. As shown in FIG. 4, four tabs 402 extent from the cover of the splice enclosure 400 to engage four corresponding protrusions 404 located on both side walls of the body of the splice enclosure 400. In alternative embodiments of the invention, the protrusions 404 may be located on the cover of the splice enclosure 400 and the tabs 402 may be located on the body of the splice enclosure 400 and provide essentially the same snap connection to close the splice enclosure 400. With the exception of a hinged cover to the splice box, the other features of the splice boxes shown in FIGS. 1-3, such as the internal structural, wireways, and splice connection retention and/or wire retention features may also be incorporated into the example embodiment splice enclosure 400 shown in FIG. 4.

FIG. 5 is a recessed luminaire installation 500 using a splice enclosure 502 in accordance with an example embodiment of the invention. As shown in FIG. 5, the splice enclosure 502 provides a housing for wired connection between the AC (or DC) power supply connector located in the housing 504 or an associated junction box 510 and the power supply circuitry, such as a driver or drive electronics, 508 on the recessed luminaire 506. The housing 504 and LED-based light module or luminaire 506 are examples of many possible housings and luminaires (and various combination of the same) with which the splice enclosure 502 may be used.

As shown in the example embodiment of FIG. 5, the splice enclosure 502 houses an electrical connection between one electrical connector connected to the driver 508 of the light module 506 and another connector with wiring extending from the splice enclosure to another electrical connector for connecting to the power supply connector (e.g., an Edison-based socket or other connector) located in the fixture housing 504 or the junction box 510. The splice connection may be made along with enclosing the splice enclosure 502 during manufacturing of the light module 506, or alternatively, may be made (or re-connected) during installation of the light module 506 into the recessed housing 504 or junction box in the case where no housing is present.

FIG. 6 shows another recessed luminaire installation 600 using a splice enclosure 608 in accordance with an example embodiment of the invention. Similar to the recessed luminaire installation of FIG. 5, FIG. 6 shows a recessed light fixture housing 602 for housing a light module 610, such as an LED-based light module that contains a driver 612 associated with a splice enclosure 608. As shown in the example embodiment of FIG. 6, an electrical connector 606, which also may be referred to as an adaptor, is connected to a receptacle 604 associated with the luminaire housing 602. In one example embodiment of the invention, the electrical connector 606 may be an Edison socket adapter and the receptacle 604 may be an Edison based socket. In an alternative embodiment of the invention, the receptacle 604 may be another electrical connector, which may be referred to as a power supply connector, configured to mate with the electrical connector 606. The connection between the receptacle 604 and the electrical connector 606 allows for power to be transferred to the light module through the splice connection enclosed by the splice enclosure 608.

FIG. 7 is a cross sectional view of a splice enclosure 700 showing the enclosed connection in accordance with an example embodiment of the invention. As shown in FIG. 7, an electrical connector 702 is connected to another electrical connector 704 and such connection is enclosed by the splice enclosure 700. The splice connection enclosed by the splice enclosure 700 allows for power to be delivered to the light module associated with the splice enclosure 700. The electrical connector 702 and 704 shown in FIG. 7 is a PowerPlug® Luminaire Disconnect from Ideal Industries, Inc., however, it will be apparent that alternate types of connectors can be used with the embodiments described herein.

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the specific embodiments disclosed are not limiting and that modifications and other embodiments are intended to be included within the scope of this application. Although specific terms are employed herein, they are used in a generic and descriptive sense only and not for purposes of limitation.

The invention claimed is:

1. A splice enclosure for a luminaire comprising:
    a bottom housing having a base, two side walls and two end walls,
        wherein at least one of the two side walls include an outer surface having at least one protrusion, and the two end walls each include contoured grooves; and
    a cover comprising at least one tab extending substantially orthogonal from at least one of two side walls of the cover and a notched protrusion located on an internal surface of each end wall of the cover,
        wherein the at least one tab is adapted to engage with the protrusion located on the outer surface of the at least one of the two side walls of the bottom housing,
        wherein the notched protrusion is adapted to align with and overlap with the contoured grooves when the cover and the bottom housing of the splice enclosure are engaged, the overlapping of the notched protrusion and the contoured grooves to provide wire guidance for a splice connection associated with the splice enclosure, and
        wherein the cover is hinged to at least one of the two side walls of the bottom housing.

2. The splice enclosure of claim 1, wherein the cover and bottom housing are rectangular.

3. The splice enclosure of claim 1, further comprising an interior surface of one of the end walls or side walls of the bottom housing includes a rib protruding from the interior surface.

4. The splice enclosure of claim 1, wherein the cover and bottom housing are made of a fire resistant material that satisfies a 5VA flame rating.

5. The splice enclosure of claim 1, wherein the cover and bottom housing are coated with a fire resistant material that satisfies a 5VA flame rating.

6. A splice enclosure for a luminaire comprising:
   a bottom housing having a base, two side walls and two end walls,
      wherein the two side walls each include an outer surface having at least one protrusion, and wherein each end wall of the bottom housing includes at least one contoured groove;
   a cover having at least two tabs extending substantially orthogonal from the cover and a notched protrusion located on an internal surface of each end wall of the cover,
      wherein the at least two tabs are located on opposite sides of the cover and configured to engage the corresponding protrusion located on the outer surface of the side walls of the bottom housing, and
      wherein the notched protrusion is adapted to overlap with the contoured groove when the cover and the bottom housing of the splice enclosure are engaged such that a surface of the notched protrusion is in contact with a surface of the contoured groove, the overlapping of the notched protrusion and the contoured grooves to provide wire guidance for a splice connection associated with the splice enclosure.

7. The splice enclosure of claim 6, wherein the cover and bottom housing are rectangular.

8. The splice enclosure of claim 6, further comprising an interior surface of one of the end walls or side walls includes a rib protruding from the interior surface.

9. The splice enclosure of claim 6, wherein the cover and bottom housing are made of a fire resistant material that satisfies a 5VA flame rating.

10. The splice enclosure of claim 6, wherein the cover and bottom housing are coated with a fire resistant material that satisfies a 5VA flame rating.

11. A luminaire comprising:
   a light module, wherein the light module includes a light source, a driver with a first electrical connector connected to the driver and a second electrical connector connected to the first electrical connector; and
   a splice enclosure surrounding the first and second electrical connector, wherein the splice enclosure includes a cover,
      wherein the cover includes at least one tab extending substantially orthogonal from the cover, two end walls, and a notched protrusion extending from an interior surface of each end wall of the cover, and
      wherein the splice enclosure includes a bottom housing having a base, two side walls and two end walls, wherein at least one of the side walls or end walls includes an outer surface having at least one protrusion that is configured to engage the at least one tab, and wherein each end wall of the bottom housing includes contoured grooves, and wherein the notched protrusions of the cover are adapted to overlap with the contoured grooves of the bottom housing when the cover and the bottom housing of the splice enclosure are engaged, the overlapping of the notched protrusion and the contoured grooves to provide wire guidance for a splice connection associated with the splice enclosure.

12. The luminaire of claim 11, wherein the second electrical connector is attached to a third electrical connector located outside the splice enclosure, wherein the third electrical connector is connected to a receptacle.

13. The luminaire of claim 12, wherein the receptacle is associated with a recessed light fixture or a junction box.

14. The luminaire of claim 11, wherein the cover is hinged to at least one side wall or end wall of the bottom housing.

15. The luminaire of claim 11, wherein the cover and bottom housing are made of a fire resistant material that satisfies a 5VA flame rating.

16. The luminaire of claim 11, wherein the cover and bottom housing are coated with a fire resistant material that satisfies a 5VA flame rating.

* * * * *